Jan. 17, 1928.
E. G. THOMAS
COMPUTING SCALE
Filed March 22, 1920
1,656,454
3 Sheets-Sheet 1
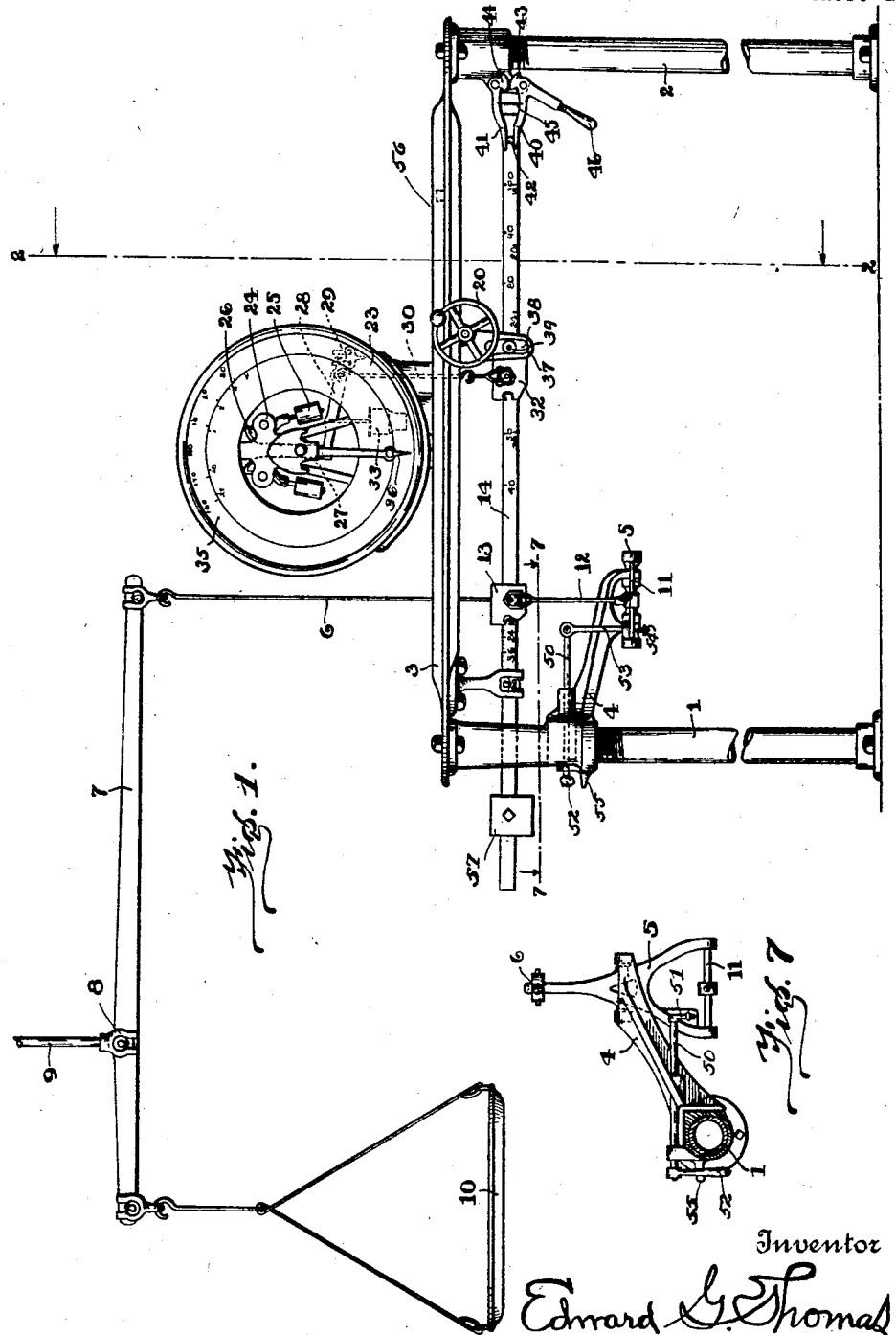
Inventor
Edward G. Thomas
By George R. Frye
Attorney Jan. 17, 1928.
E. G. THOMAS
COMPUTING SCALE
Filed March 22, 1920
1,656,454
3 Sheets-Sheet 2
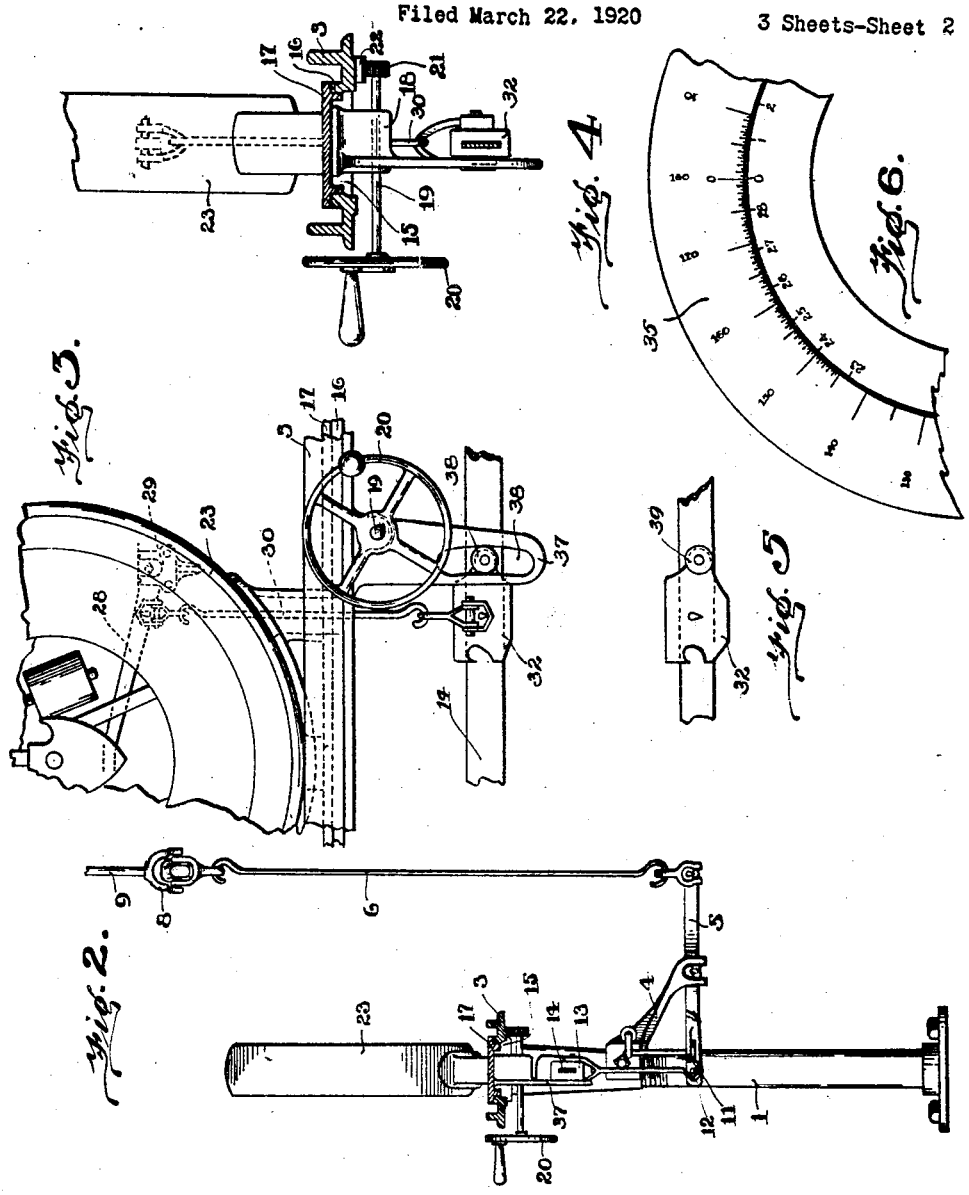
Inventor
Edward G. Thomas.
By George R. Frye
Attorney Jan. 17, 1928.
E. G. THOMAS
COMPUTING SCALE
Filed March 22, 1920
1,656,454
3 Sheets-Sheet 3
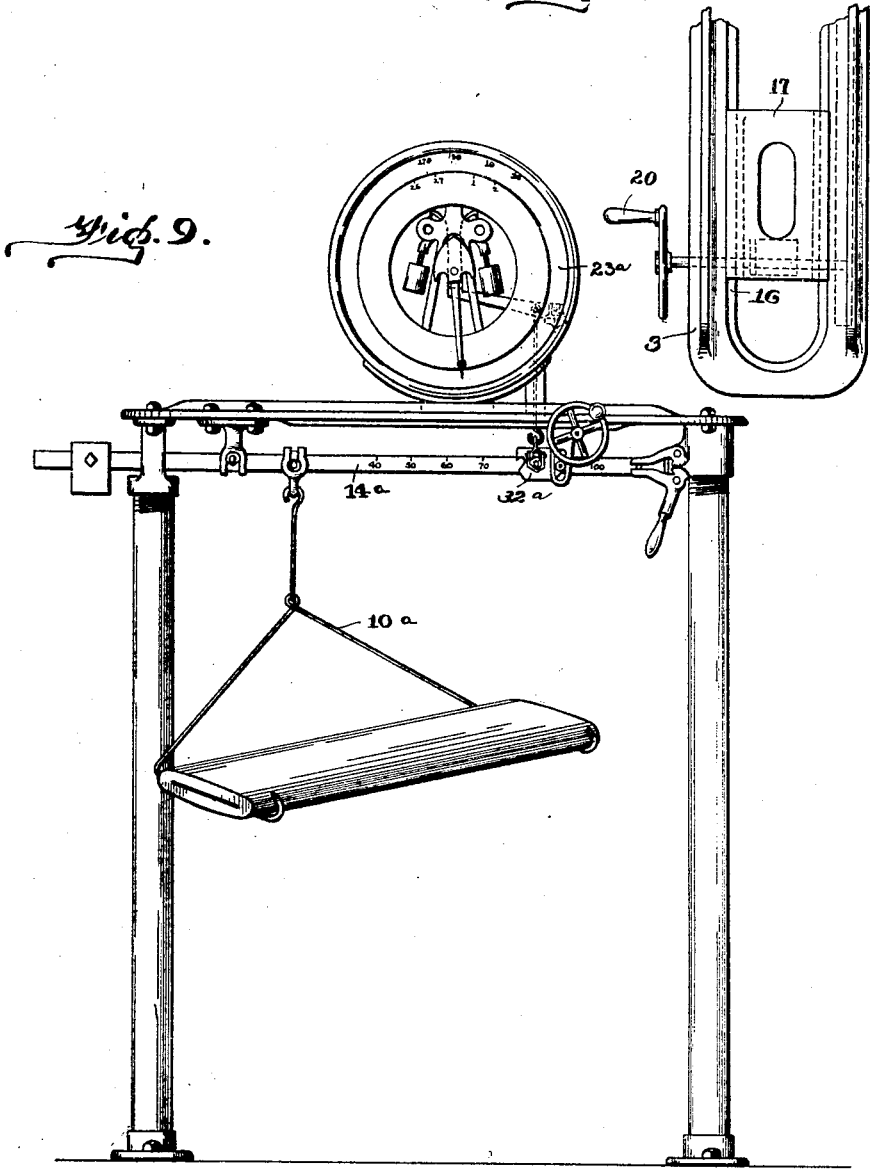

Patented Jan. 17, 1928.

1,656,454

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

COMPUTING SCALE.

Application filed March 22, 1920. Serial No. 367,645.

This invention relates to computing scales, and more particularly to scales for determining weights per unit of length or area, usually termed "yardage scales" and to scales for determining the number of units in a given lot, commonly known as "counting scales."

One of the objects of my invention is to provide automatic means for determining weights per unit of length of cloth, cordage, paper, and similar commodities.

Another object is the provision of automatic means for determining the weight per unit of area of fabric or other sheet material.

Another object is to provide a device of this character which is also capable of use as an automatic weighing scale for determining the total weights of commodities.

Still another object is the provision of mechanism which may be employed as an automatic counting device.

Other objects and advantages will be apparent from the following description, in which reference is had to the accompanying drawings illustrating preferred embodiments of my invention and in which similar reference numerals designate similar parts throughout the several views.

In the drawings:

Figure 1 is a front elevation of a scale embodying my invention, capable of indicating weights per square yard of pieces of fabric of various lengths and widths;

Figure 2 is a sectional view thereof taken substantially on the line 2—2 of Figure 1, the commodity-receiver being omitted;

Figure 3 is a fragmentary front elevation on an enlarged scale showing a connection between the automatic load-offsetting mechanism and lever mechanism forming elements of my invention;

Figure 4 is a fragmentary side elevation thereof, parts being shown in section;

Figure 5 is a detail elevation of a slide employed in changing the multiplication of the scale;

Figure 6 is a further enlarged fragmentary front elevation of a chart employed in one form of my invention;

Figure 7 is a detail sectional view taken substantially on the line 7—7 of Figure 1;

Figure 8 is a fragmentary plan view showing a portion of the frame of the scale and a carriage movable therealong; and Figure 9 is a front elevation of a simpler form of scale embodying my invention and arranged to indicate weight per square yard of cloth or other similar material of uniform width or weight per linear yard.

I have shown my invention as embodied in a yardage scale, but it is to be understood that it is also capable of employment in other computing devices and that I contemplate its use wherever applicable.

Referring to the drawings in detail, and particularly to Figures 1 to 8 inclusive, the frame of the machine comprises a pair of posts 1 and 2 and a cross piece 3 secured to and connecting the upper ends of said posts. Secured to the post 1 adjacent its upper end is a bracket 4 upon which is fulcrumed a lever 5 shown in this instance as having arms of equal length. The lever 5 is connected by means of a tension rod 6 to one end of a lever 7 fulcrumed in bearings 8 carried by a rod 9 which depends from the ceiling or other convenient support (not shown). The other end of the lever 7 supports a commodity-receiver 10 which may be shaped according to the use to be made of the scale. The opposite end of the lever 5 lies below the cross piece 3 and carries an elongated pivot 11 which engages a bearing at the lower end of a rod 12 depending from a slide 13 mounted on a beam 14 which is fulcrumed in a bracket secured to the lower side of the cross piece 3. The beam 14 lies throughout its length below the cross piece 3 and constitutes a lever, the arms of which may be varied proportionally to the length and width of the piece of goods being weighed, in a manner to be hereinafter explained.

The cross piece 3 is centrally slotted, as at 15, throughout the greater part of its length, and guide rails 16 are provided on each side of the slot to slidably support a carriage 17, of which a portion 18 projects downwardly through the slot 15. A shaft 19 is journaled in the downwardly-projecting portion 18 of the carriage and at one end is provided with a hand wheel 20, while a pinion 21 is fixed upon its opposite end and meshes with a stationary rack 22 on the lower side of the cross piece 3. When the hand wheel 20 is turned, the pinion 21 will roll along the rack 22 and cause the carriage to slide along the guide rails 16.

Mounted upon the carriage 17 is a substantially watch-case-shaped housing 23 containing a frame 24 which pivotally supports a pair of load-offsetting pendulums 25. Each of the pendulums 25 is provided with a power sector 26 connected by means of flexible metallic ribbons 27 to a lever 28 which is fulcrumed at 29 within the housing 23. The lever 28 is connected to the beam 14 through a link 30 and a slide 32, as is clearly shown in Figure 3.

When a load is placed upon the commodity-receiver 10 the lever 7 is rocked upon its fulcrum and the tension rod 6 is pulled upwardly, thereby rocking the lever 5 and causing a downward pull upon the rod 12, which swings the beam 14 downwardly. Downward movement of the beam 14 acts through the link 30, lever 28 and ribbons 27 to swing the pendulums 25 outwardly and upwardly until the load on the scale is counterbalanced. A dash pot shock absorber 33 connected to the lever 28 serves to damp the movement of the connected parts.

The housing 23 has a crystal face through which a dial 35 is visible. A hand 36 is mounted within the housing to swing over the dial and is connected by means of suitable gearing (not shown) to the load-offsetting mechanism to have movement over the dial proportional to the movement of said mechanism in offsetting a load.

The type of automatic load-counterbalancing and indicating device illustrated is merely exemplary. Spring or other counterbalancing devices may obviously be substituted for the pendulum mechanism and other types of indicating devices may be substituted for the hand and dial. Depending from the carriage 17 is an arm 37 having an arcuate slot 38 which receives a roller 39 mounted upon the slide 32, so that as the carriage is moved along the cross piece 3 the slide will be moved along the beam 14. In order that the beam 14 may swing without interference it is necessary that there be no binding between the roller 39 and the arm 37. The side of the slot nearest the fulcrum of the beam is therefore made to conform to an arc of less radius than the arc about which the roller 39 moves when in its position nearest the fulcrum of the beam 14, while the other side of the slot is made to conform to an arc of greater radius than that about which the roller moves when in its position most distant from the fulcrum of the beam. The slot is therefore wider at its ends than at its center. Since it is desirable for accurate operation that the connection between the slide 32 and the lever 28 be plumb in all positions of the carriage and slide, I have provided a device to hold the roller in the center of the slot, while the width of the slot is very little greater than the diameter of the roller, and there is thus a minimum of play between them.

The centering device consists of a pair of jaws 40 and 41 pivotally mounted adjacent the upper end of the post 2 and engaging a pin 42 on the beam 14. The jaw 41 is provided with a gear sector 43 which meshes with a similar sector 44 on the jaw 40 so that as the jaw 41 is moved in either direction about its pivot, an equal and opposite movement is imparted to the jaw 40. Moving the jaws together, therefore, always brings the beam 14 into position with the roller 39 in the center of the slot 38. A retractile spring 45 yieldably holds the jaws in centering position, while a handle 46 is provided to facilitate opening the jaws and thereby freeing the beam for weighing operations.

If a piece of goods of any given length be placed upon the pan 10, movement of the indicator hand will be proportional to the weight of the goods per linear yard. Thus, if a piece of goods 100 yds. long weighing 7 ozs. per linear yard swings the indicator hand through 90°, a piece of goods 100 yds. long weighing 14 ozs. per linear yard will swing the indicator hand through 180°. The dial 35 may, therefore, be so graduated that the hand will indicate the weights per linear yard directly in ounces or other units of weight. Movement of the indicator hand will also be proportional to the weight of the goods per square yard. Thus, if a piece of goods 100 yds. long and 24 ins. wide weighing 7 ozs. per square yard swings the indicator hand through 60°, a piece of goods 100 yds. long and 24 ins. wide weighing 14 ozs. per square yard will swing the indicator hand through 120°. If the pieces be of uniform width, or if the number of square yards in each piece be known so that the slide 32 may be set accordingly, the dial 35 may be so graduated that the hand will indicate the weight of goods per square yard directly in ounces or other units of weight.

Bolts of cloth, for use in which this scale is particularly designed, are not of uniform lengths or widths. The scale, however, is employed in conjunction with a measuring machine, so that the length of each bolt to be tested is known. Since any known form of measuring machine or any preferred process of measuring may be used to determine the dimensions of the goods to be weighed, I have not illustrated and will not describe any particular type.

In weighing a bolt of cloth the pull upon the pendulums is directly proportional to the load on the scale and inversely proportional to the lever arm acting upon the link 30—i. e., the portion of the beam 14 between its fulcrum and the pivot on the slide 32. The load upon the scale is equal to the weight of the goods per yard multiplied by the number of yards in the piece. One-half a bolt of cloth will move the hand through half the arc that it is moved by the whole bolt, but if, when we shorten the piece of cloth we also proportionally shorten the distance between the fulcrum of the beam 14 and the slide 32, the hand will move through the same arc as that through which it was before moved by the entire bolt. This arc is in either case proportional to the weight per yard of the goods. In other words, the arc of movement of the indicator hand is proportional to the weight per yard multiplied by the number of yards divided by the distance from the fulcrum of the beam 14 to the pivot of the slide 32. Since the length of the piece is known, variation in the number of yards may be compensated for by moving the slide 32. The only uncompensated variable, therefore, is the weight per yard, which is directly indicated on the dial.

The parts of the scale are, in the illustrated example, so proportioned that bolts varying in length from 40 to 100 yds. may be tested. The 100 yd. graduation is placed near the free end of the beam 14; the 50 yd. graduation is placed midway between the fulcrum and the 100 yd. graduation; the 75 yd. graduation midway between the 50 and 100 yd. graduations, etc.

When it is desired to determine the weights per unit of area—for example, per square yard—of pieces of goods of varying widths, another factor enters into the problem. The widths, like the lengths, are ascertained by a measurement and variations in width are compensated for by varying a lever arm upon which the weight acts—viz., the distance between the fulcrum of the beam 14 and the pivot on the slide 13. If the piece being tested is 36 ins. wide, the weight per linear yard and the weight per square yard will be the same. The position in which the slide 13 should remain when the scale is being used to determine the weight per unit of length is therefore marked with a graduation numbered 36. If the width of the piece be reduced one-half, the downward pull upon the rod 12 will be reduced one-half, so the slide 13 should be moved to double the distance from the fulcrum of the beam 14, thereby doubling the leverage upon which the rod acts. This position of the slide is marked with a graduation numbered 18. The indicator hand 36 will then point to the same value in indicating the weight per square yard of a piece of goods 18 ins. wide as in indicating the weight per square yard of a piece of the same goods 36 ins. wide. The 24 in. graduation is midway between the 36 in. and 18 in. graduations. The 12 in. graduation is three times as far from the fulcrum as the 36 in. graduation.

As above stated, the rod 12 which connects the lever 5 and the slide 13 is connected at its lower end with an elongated pivot 11 in one end of the lever 5. By slightly raising this end of the lever 5 the pivot is disengaged from the bearing at the end of the rod, so that the rod hangs freely from the slide 13. If the slide be moved to any perpendicular position and the pivot lowered into engagement with the bearing at the end of the rod 12, the connection between the lever 5 and beam 14 will not be out of plumb.

In order to facilitate lifting the pivot 11 from its bearing, a shaft 50 having an arm 51 fixed to one end thereof and a handle 52 fixed to its other end is journaled in the bracket 4, and a link 53 depends from the free end of the arm 51 and passes loosely through a comparatively large opening in the lever 5. A knob 54 is fixed upon the lower end of the link 53 at some distance below the lever. During weighing operations the lever 5 is out of contact with the link 53 and the knob 54, but when the shaft 50 is rotated, the knob engages the lower side of the lever 5 and lifts the pivot 11 from its bearing. A stop 55 serves to limit the movement of the lifting device.

The scale dial as illustrated has two sets of graduations, upon one of which the weight per unit of length or area may be indicated, as above explained, and upon the other of which the total weight of the commodity may be indicated. The side of the beam 14 is provided adjacent the lower edge with a series of graduations spaced at distances from the fulcrum proportional to the distance of the "width" graduations and are marked with corresponding numerals. When it is desired to ascertain the total weight of a commodity, the slide 32 is moved to the graduation at the lower edge of the beam which has a number corresponding to the number of the "width" graduation at which the slide 13 stands. The total weight graduations on the chart are so spaced that when the slide 13 is moved to a graduation at the lower edge of the beam corresponding to the "width" graduation at which the slide 13 is set, the total weight will be correctly indicated on the dial. With the slides in these positions the scale may be used for ordinary weighing. A stop 56 prevents movement of the carriage beyond the 100 yd. graduation. The beam 14 is extended beyond its fulcrum to support a sealing weight 57 for balancing the lever mechanism.

The form shown in Figure 9 is similar to that above described except in that the commodity-receiver 10$^a$ is attached directly to the beam 14$^a$, and the levers 5 and 7 and their appurtenances are omitted. The housing 23$^a$ and the load-offsetting and indicating mechanism contained therein are identical with the corresponding parts of the form first described, as are the carriage and other parts supported thereby. The scale is used in the same manner for determining total weights and weights per linear unit, but only one slide is provided for changing the leverage, so that the scale is not adapted for indicating weight per square yard of pieces of varying widths. If, however, the scale is to be used in weighing fabric of uniform width, regardless of what the width is, the dial may be graduated to show the weight per square yard. By suspending the commodity-receiver 10ª from a slide instead of from a fixed pivot the scale may be made to take care of variations in width in the manner above explained.

The machine may be used for counting with slightly different construction and markings, substantially as embodied in my companion application, filed July 30, 1920, Ser. No. 400,015.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In a computing device, in combination, a commodity-receiver, lever mechanism connected to said commodity-receiver, means for varying the multiplication of said lever mechanism according to a plurality of factors of the weight of an article, and automatic means connected to said lever mechanism for indicating the remaining factor thereof, substantially as described.

2. In a computing device, in combination, a frame, a lever having a fulcrum thereon, a slide on said lever movable toward and away from said fulcrum, and automatic load-offsetting mechanism connected to said slide.

3. In a computing device, in combination, a frame, a lever fulcrumed thereon, a carriage mounted on said frame, load-offsetting mechanism carried by said carriage, means connecting said load-offsetting mechanism to a point on said lever, and means for moving said carriage along said frame and said point of connection along said lever.

4. In a computing device, in combination, a frame, a lever fulcrumed thereon, a carriage mounted on said frame, automatic load-offsetting mechanism carried by said carriage, means connecting said load-offsetting mechanism to a point on said lever, and means for simultaneously moving said carriage along said frame and said point of connection said lever.

5. In a computing device, in combination, a frame, a lever fulcrumed thereon, a carriage mounted on said frame, load-offsetting mechanism supported by said carriage, a slide on said lever, connections between said slide and said load-offsetting mechanism, and means to move said slide along said lever as said carriage is moved on said frame.

6. In a computing device, in combination, a frame, a lever fulcrumed thereon, a carriage mounted on said frame, load-offsetting mechanism supported by said carriage, a slide on said lever, connections between said slide and said load-offsetting mechanism, and a member connected to said carriage and engaging a portion of said slide to move said slide along said lever as said carriage is moved on said frames.

7. In a computing device, in combination, a frame, a lever fulcrumed thereon, a carriage mounted on said frame, load-offsetting mechanism supported by said carriage, a slide on said lever, connections from said slide to said load-offsetting mechanism, a member connected to said carriage and having a slot, and a projection on said slide extending into said slot.

8. In a computing device, in combination, a frame, a lever fulcrumed thereon, a carriage mounted on said frame, load-offsetting mechanism supported by said carriage, a slide on said lever, connections from said slide to said load-offsetting mechanism, a member connected to said carriage and having a slot with a contracted portion, and a projection on said slide extending into said slot and substantially fitting said contracted portion.

9. In a computing device, in combination, a frame, a lever fulcrumed thereon, a carriage mounted on said frame, load-offsetting mechanism supported by said carriage, a slide on said lever, connections from said slide to said load-offsetting mechanism, a member connected to said carriage and having a slot with a contracted portion, a projection on said slide extending into said slot and substantially fitting said contracted portion, and means for positioning said lever with said projection in the contracted portion of said slot.

10. In a computing device, in combination, a frame, a lever fulcrumed thereon, a carriage mounted on said frame, load-offsetting mechanism supported by said carriage, a slide on said lever, connections from said slide to said load-offsetting mechanism, a member connected to said carriage and having a slot with a contracted portion, a projection on said slide extending into said slot and substantially fitting said contracted portion, means for positioning said lever with said projection in the contracted portion of said slot, and means for releasing said lever-positioning means to permit said lever to move in either direction.

11. A lever-positioning device comprising, in combination, a pair of pivoted members adapted to engage a lever, gearing connecting said members for opposite movement, and resilient means urging said members toward each other.

12. In a computing device, in combination, a lever, automatic load-offsetting mechanism, a connection between said lever and load-offsetting mechanism, a second lever, a commodity-receiver means connecting said commodity-receiver to said second lever, a slide on one of said levers, and a connection from said slide to the other of said levers.

13. In a computing device, in combination, a lever, automatic load-offsetting mechanism connected thereto, a second lever at right angles to the first said lever, and means connecting said levers, said means being shiftable longitudinally of one of said levers and transversely of the other.

14. In a device of the class described, in combination, a lever having an elongated pivot, a second lever extending parallel to said pivot, a connection shiftable along the said second lever and along said pivot, automatic load-offsetting mechanism connected to the said second lever, and means for shifting the point of connection of said load-offsetting mechanism and said lever.

15. In a device of the class described, in combination, a lever, a slide thereon, a second lever extending at right angles to the first said lever and having an elongated pivot fixed thereto, a bearing shiftable along said pivot, a connection between said bearing and said slide, a second slide on said first lever, and load-offsetting mechanism connected to said second slide.

16. In a device of the class described, in combination, a lever, an elongated pivot fixed to said lever, a bearing supporting said pivot, means for lifting said pivot from said bearing, including a link having a lost motion connection with said lever, a second lever, a connection from said bearing to said second lever, and means for shifting said connection along said second lever and for shifting said bearing longitudinally of said pivot.

17. In a computing device, in combination, a lever having a fulcrum, automatic load-offsetting mechanism connected to said lever, load-applying mechanism connected to said lever, and means for shifting the points of connection with said lever of said automatic load-offsetting mechanism and said load-applying mechanism.

18. In a computing device, in combination, a frame, a lever having a fulcrum thereon, a slide on said lever movable toward and away from said fulcrum, automatic load-offsetting mechanism connected to said slide, a second slide on said lever, and load-applying mechanism connected to said second slide.

19. In a computing device, in combination, a frame, a lever fulcrumed thereon, a carriage mounted on said frame, load-offsetting mechanism carried by said carriage, means connecting said load-offsetting mechanism to a point on said lever, means for moving said carriage along said frame and said point of connection along said lever, load-applying mechanism connected to said lever, and means for shifting the point of connection of said load-applying mechanism with said lever.

20. In a computing device, in combination, a frame, a lever fulcrumed thereon, a carriage mounted on said frame, automatic load-offsetting mechanism carried by said carriage, means connecting said load-offsetting mechanism to a point on said lever, means for simultaneously moving said carriage along said frame and said point of connection along said lever, a second slide on said lever, and a commodity-receiver connected to said second slide.

21. In a computing device, in combination, lever mechanism, a commodity-receiver connected thereto, means for adjusting the leverage of said lever mechanism according to a dimension of a commodity, and means connected to said lever mechanism to automatically indicate the average weight of said commodity per dimensional unit.

22. In a computing device, in combination, lever mechanism, a commodity-receiver connected thereto adapted to support a piece of fabric, means for adjusting the lever mechanism according to the area of the piece of fabric to be tested, automatic load-offsetting means connected to said lever mechanism, and an indicating device connected to said automatic load-offsetting means and graduated to indicate weight per unit of area.

23. In a device of the class described, in combination, lever mechanism, means for changing the multiplication of said lever mechanism, automatic load-offsetting mechanism, and indicating mechanism having one set of graduations arranged to indicate the total weight of a commodity and another set of graduations arranged to indicate the weight per dimensional unit of such commodity.

24. In a device of the class described, in combination, a beam, a commodity-receiver, means adjustably connecting said commodity-receiver to said beam, said beam having a series of graduations for determining points of connection therewith of said commodity-receiver, load-offsetting mechanism, means for adjustably connecting said load-offsetting mechanism to said beam, said beam having a series of graduations for determining points of connection therewith of said load-offsetting mechanism, the distances from the fulcrum of corresponding graduations in the respective series being in the same ratio.

EDWARD G. THOMAS.